US012655243B2

(12) United States Patent
Grunder et al.

(10) Patent No.: US 12,655,243 B2
(45) Date of Patent: Jun. 16, 2026

(54) TWO-PART INTERFACE MATERIALS, SYSTEMS INCLUDING THE INTERFACE MATERIAL, AND METHODS THEREOF

(71) Applicant: DDP Specialty Electronic Materials US, LLC, Wilmington, DE (US)

(72) Inventors: Sergio Grunder, Freienbach (CH); Daniel Schneider, Freienbach (CH); Andreas Lutz, Freienbach (CH); Marcel Aschwanden, Freienbach (CH); Nina Hillesheim, Freienbach (CH)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 0 days.

(21) Appl. No.: 18/965,697

(22) Filed: Dec. 2, 2024

(65) Prior Publication Data

US 2025/0092182 A1 Mar. 20, 2025

Related U.S. Application Data

(63) Continuation of application No. 17/606,331, filed as application No. PCT/US2020/032072 on May 8, 2020, now abandoned.

(Continued)

(51) Int. Cl.
*C08G 18/10* (2006.01)
*C08G 18/20* (2006.01)

(Continued)

(52) U.S. Cl.
CPC .......... *C08G 18/10* (2013.01); *C08G 18/2063* (2013.01); *C08G 18/24* (2013.01); *C08G 18/3225* (2013.01); *C08G 18/8067* (2013.01); *C08K 3/22* (2013.01); *H01M 10/613* (2015.04); *H01M 10/653* (2015.04); *C08K 2003/2227* (2013.01); *C08K 2201/001* (2013.01); *C08K 2201/005* (2013.01)

(58) Field of Classification Search
CPC .... C08G 18/10; C08G 18/2063; C08G 18/24; C08G 18/3225; C08G 18/8067
See application file for complete search history.

(56) References Cited

U.S. PATENT DOCUMENTS 4,328,330 A * 5/1982 Wellner ............. C08G 18/8067
528/53
5,648,421 A 7/1997 Thiele et al.
(Continued)

FOREIGN PATENT DOCUMENTS

CN 105764618 A 7/2016
CN 109715690 A 5/2019
(Continued)

OTHER PUBLICATIONS

Kirillov, "Epoxy-urethane binders based on the blocked isocyanate Desmocap 11", Polymer Science Series D, vol. 7, No. 1, Feb. 2014 (Feb. 2014), pp. 14-18.

(Continued)

*Primary Examiner* — Michael L Leonard

(57) ABSTRACT

A new composition for thermal interface materials that provide improved thermal conductivity without requiring filler materials that are expensive or abrasive.

19 Claims, 5 Drawing Sheets

(A)       (B)       (C)

Related U.S. Application Data

(60) Provisional application No. 62/850,797, filed on May 21, 2019.

(51) Int. Cl.

| | | |
|---|---|---|
| *C08G 18/24* | (2006.01) | |
| *C08G 18/32* | (2006.01) | |
| *C08G 18/80* | (2006.01) | |
| *C08K 3/22* | (2006.01) | |
| *H01M 10/613* | (2014.01) | |
| *H01M 10/653* | (2014.01) | |

(56) References Cited

U.S. PATENT DOCUMENTS

| | | | |
|---|---|---|---|
| 7,408,943 | B2 | 8/2008 | Grimminger |
| 2004/0097635 | A1 | 5/2004 | Fan et al. |
| 2009/0250655 | A1 | 10/2009 | Sano et al. |
| 2011/0141698 | A1 | 6/2011 | Chiou et al. |
| 2011/0151180 | A1 | 6/2011 | Haupt |
| 2011/0245373 | A1 | 10/2011 | Yoda |
| 2015/0140411 | A1 | 5/2015 | Li et al. |
| 2017/0174959 | A1 | 6/2017 | Zhou et al. |

FOREIGN PATENT DOCUMENTS

| | | | | |
|---|---|---|---|---|
| DE | 4015156 | A1 | 11/1991 | |
| JP | 20100138357 | A | 1/2012 | |
| JP | 2017505507 | A | 2/2017 | |
| KR | 101830523 | B1 | 2/2018 | |
| WO | 2001041213 | A1 | 6/2001 | |
| WO | WO-2006016936 | A1 * | 2/2006 | .............. C08L 23/00 |
| WO | 2014047932 | A1 | 4/2014 | |
| WO | 2015076985 | A1 | 5/2015 | |
| WO | 2015148318 | A1 | 10/2015 | |
| WO | 2016145651 | A1 | 9/2016 | |
| WO | 2017091974 | A1 | 6/2017 | |
| WO | 201834721 | A1 | 2/2018 | |
| WO | 2018051740 | A1 | 3/2018 | |
| WO | 2018232239 | A1 | 12/2018 | |

OTHER PUBLICATIONS

Int'l Search Report and Written Opinion in Int'l Application No. PCT/US2020/032072, issues Aug. 5, 2020.

* cited by examiner 91 wt.%

88 wt. %

85 wt. %

78 wt. %

(A)                    (B)                    (C)

30

32

36

34

Thermal Interface Material
2 – 3 W/mK

Thermal Management of Battery Module(s)

TWO-PART INTERFACE MATERIALS, SYSTEMS INCLUDING THE INTERFACE MATERIAL, AND METHODS THEREOF

This application claims priority to U.S. patent application Ser. No. 17/606,331, filed on Oct. 25, 2021, which claimed priority to International Application No. PCT/US20/32072, filed on May 8, 2020, which claimed priority to U.S. Patent Application Ser. No. 62/850,797, filed on May 21, 2019. All parent applications are incorporated herein by reference in their entireties.

The teachings herein are directed to thermal interface materials having generally high thermal conductivity, components and articles including the thermal interface material, and related methods. The thermal interface material is preferably formed of a two-part composition, where each part includes a matrix phase that is a liquid at room temperature and one or more thermally conductive fillers dispersed in the matrix phase. The matrix phase of the first part preferably includes a carbamate containing compound and the matrix phase of the second part preferably includes a carbamate-reactive compound.

The automotive industry has seen a trend to reduce the weight of the vehicles in the past decade. This lightweight trend has been mainly driven by regulations to reduce the $CO_2$ emission of the vehicle fleet. In recent years lightweight construction strategies have been further fueled by the increasing number of electrically driven vehicles. The combination of a growing automotive market and a growing market share of electrically powered vehicles leads to a strong growth in the number of electrically driven vehicles. To provide long driving ranges batteries with a high energy density are needed. Several battery strategies are currently followed with differing detailed concepts, but what all long-range durable battery concepts have in common is that a thermal management is needed. In particular, to thermally connect battery cells or modules to a cooling unit, thermal interface materials, based on two-part reactive compositions, are needed.

Various composition include conductive fillers and two-part reactive compositions are described in PCT Patent Application numbers WO 2001/041213 A1: WO 2014/047932 A1, WO 2015/148318 A1; WO 2016/145651 A1; WO 2017/091974 A1; WO 2018/34721; and WO 2006/016936 A1; European Patent Application EP 1438829 A1; Japan Patent Application JP 2010/0138357 A; and US Patent Application US 2009/0250655 A1; each incorporated by reference herein in its entirety. In these prior attempts, the compositions suffered on one or more of the needs for an affordable thermal interface material, such as the thermal conductivity of the composition is insufficient, the composition is difficult to produce, the composition does not properly fill gaps so that the contact is insufficient; the components of the composition do not react at room temperature, one or both of the components has poor shelf life stability, the composition requires expensive material; or the composition requires abrasive filler that can damage processing equipment.

There continues to exist a need for a thermal interface material (and particularly a two-part composition) having both high thermal conductivity and low viscosity. There is also a continuing need for thermal interface materials having filler materials that are non-abrasive. There is also a continuing need for thermal interface materials that are more economical with respect to raw material costs and/or manufacturing/processing costs. There is also a need for a two-part composition having high filler content that is able to flow at room temperature to fill a gap. There is also a need for a material meeting one or more of the above needs that also has one or more of the following features: shelf stable (e.g., maintain ability to flow at room temperature after aging); ability to react at room temperature to polymerize, cross-link or both; good thermal conductivity; substantially or entirely avoids use of abrasive filler; or is light weight (e.g., having a specific gravity of about 3 or less, about 2.8 or less, about 2.6 or less, about 2.5 or less, or about 2.4 or less).

SUMMARY

One or more of the above needs may be achieved using a thermal interface material according to the teachings herein.

A first aspect of the teachings herein is direct to a two-part composition for a thermal interface material comprising: a first part comprising at least a prepolymer including two or more carbamate groups; and a second part comprising at least one or more polyamine compounds capable of a reaction with the prepolymer. The composition preferably includes (in the first part, the second part, or both) one or more catalysts for catalyzing the reaction between the prepolymer and the polyamine compounds; and 50 weight percent or more of one or more conductive fillers, based on the total weight of the two-part composition.

A second aspect of the invention is a method comprising a step of: arranging a layer of a thermal interface material according to the invention between a first component and a second component, and applying a pressure so that the thermal interface material contacts both the first component and the second component and fills a gap between the two components.

DETAILED DESCRIPTION

The first aspect may be further characterized by one or any combination of the following features: the prepolymer is formed by blocking one or more of the isocyanate groups (preferably substantially each, or entirely each of the isocyanate groups) of an aromatic polyisocyanate prepolymer with a phenol group of a blocking compound; the blocking compound includes a terminal phenol group (preferably a single terminal phenol group) attached to a linear hydrocarbon (preferably the linear hydrocarbon includes 6 or more, 8 or more, 10 or more, or 12 or more carbon atoms) (preferably the linear carbon includes 60 or less, 30 or less, or 20 or less carbon atoms); the one or more polyamines, the prepolymer, or both have an average functionality of greater than 2; the one or more thermally conductive fillers are preferably selected from aluminum hydroxide, aluminium oxide, aluminium powder, zinc oxide, boron nitride, and mixtures of these; the first part includes 75 weight percent or more thermally conductive fillers preferably selected from aluminum hydroxide, aluminium oxide, aluminium powder, zinc oxide, boron nitride, and mixtures of these; the second part includes 75 weight percent or more of a thermally conductive filler preferably selected from aluminum hydroxide, aluminium oxide, aluminium powder, zinc oxide, boron nitride, and mixtures of these; preferably a surface of the thermally conductive filler, for example aluminum hydroxide, is partially or entirely coated with a surface modifier for reducing the hydrophilicity of the surface; the composition includes a thermally conductive filler preferably selected from aluminum hydroxide, aluminium oxide, aluminium powder, zinc oxide, boron nitride, and mixtures of these having a broad particle size distribution as characterized by a $D_{90}/D_{50}$ ratio of about 3 or more; the composition preferably includes one or more plasticizers; the composition preferably includes a fatty acid or an ester of a fatty acid; the composition comprises an epoxy resin in the first part; a weight ratio of the prepolymer to the epoxy resin is about 0.5 or more, more preferably about 0.8 or more, even more preferably about 1.0 or more; a weight ratio of the prepolymer to the epoxy resin is about 10 or less, about 5 or less, or about 4 or less; the composition is substantially free of isocyanate containing compounds; the amount of NCO in the first-part is about 0.10 weight percent or less, about 0.05 weight percent or less, or about 0.01 weight percent or less, based on the total weight of the first part; a molar ratio of the carbamate groups in the first part to the amine groups in the second part is about 0.1 or more, about 0.2 or more, about 0.3 or more, about 0.4 or more, about 0.5 or more, or about 0.6 or more; a molar ratio of the carbamate groups in the first part to the amine groups in the second part is about and/or about 10 or less, about 5.0 or less, about 3.5 or less, about 2.5 or less, about 2.0 or less, or about 1.7 or less; the first part includes calcium carbonate; the amount of calcium carbonate in the first part and/or in the composition is about 0.1 weight percent or more, preferably about 0.5 weight percent or more, or about 1.0 weight percent or more; the first part includes some or all of the catalyst; the composition is characterized by a thermal conductivity of about 2.0 W/mK or more, preferably about 2.5 or more, more preferably about 2.8 or more, even more preferably about 2.9 or more, and most preferably about 3.0 or more, according to ASTM 5470-12 on a therma interface material tester from ZFW Stuttgart, with tests performed in Spaltplus mode at a thickness of between 1.8-1.2 mm. The described thermal interface material is considered as Type I (viscous liquids) as described in ASTM 5470-12. The upper contact is heated to ca 40° C. and the lower contact to ca 10° C., resulting in a sample temperature of ca 25° C. The A and B component are mixed with a static mixer when applied from a manual cartridge system.; the two-part composition cures at room temperature (preferably as characterized by an increase in a press-in force of about 60% or more, or about 100% or more, after aging for 24 hours after mixing); the first part is shelf stable (e.g., as characterized by a press-in force of the first part of less than 700 N after aging for 3 days at 55° C.); or the two-part composition is characterized by a specific gravity of about 2.5 or less.

Another aspect according to the teachings herein is directed to an article comprising: a first component that generates heat, a second component for removing heat, and a layer of a thermal interface material interposed between the first and second components, wherein the thermal interface material provides a path for transferring a heat from the first component to the second component. The thermal interface material is preferably formed by a two-part composition according to the teachings herein.

Another aspect according to the teachings herein is directed at a method comprising a step of: arranging a layer of a thermal interface material between a first component and a second component, and applying a pressure so that the thermal interface material contacts both the first component and the second component and fills a gap between the two components. The thermal interface material is preferably formed of a two-part composition according to the teachings herein.

DETAILED DESCRIPTION

Figure 1:
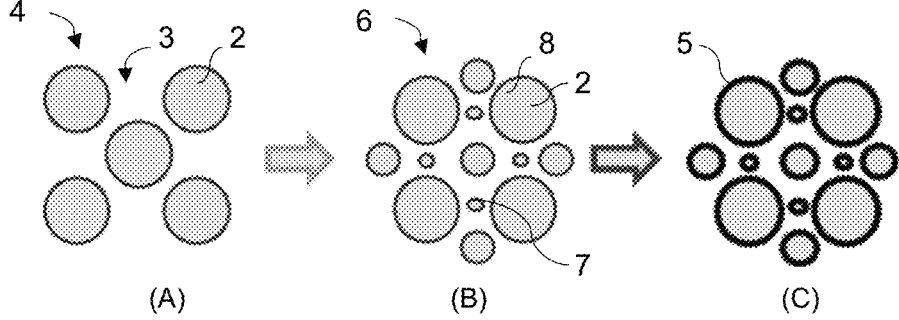
FIG. 1 is a drawing illustrating features of a composition having a filler with a generally narrow particle size distribution (A), a composition having a filler with a generally broad particle size distribution (B), and a composition having a filler with a generally broad particle size distribution that has been surface modified (C).

Unless otherwise specified, the term "consisting essentially of" includes an amount of about 90 weight percent or more, about 95 weight percent or more, about 98 weight percent or more, or about 99 weight percent or more.

Unless otherwise specified the term "conductive" and "conductivity" refers to "thermally conductive" and "thermal conductivity".

The thermal interface material includes two or more phases and preferably includes two phases. A first phase of the thermal interface material is a matrix phase. The matrix phase preferably is a continuous phase. However, the matrix phase may be a co-continuous phase and/or include one or more sub-phases. Preferably the matrix phase includes, consists essentially of, or consists entirely of one or more polymers, oligomers, or polymerizable compounds. The matrix phase preferably includes, consists essentially of, or consists entirely of one or more materials that are liquid at room temperature or require minimal heating to become a liquid. The second phase is a discrete phase that is dispersed in the matrix phase. It will be appreciated that the discrete phase may be coated with one or more additional phases that provides an interface between the discrete phase and the matrix phase. Typically, the matrix phase includes materials having generally low thermal conductivity (e.g., about 1 W/mK or less, or about 0.2 W/mK or less) so that thermal conductivity of the composition relies primarily on the discrete phase. The discrete phase includes one or more filler materials that are solid at room temperature. Because the filler phase is required to provide much of the thermal transport, it is necessary to include high concentrations of the filler to overcome the fact that the filler particles are generally dispersed in the matrix phase.

The thermal interface material may be formed from a single composition, or may be formed by combining two or more parts, each having a different composition. For example, the thermal interface material may be formed by mixing a first part (A-component) and a second part (i.e., B-component) of a two-part composition. Typically, upon mixing, the matrix phase of the composition is formed by combining a matrix phase of each part. The combined matrix phase preferably is reactive so that the molecular weight of one or more compounds in the matrix phase is increased. As one example, a compound in the first part may react with a compound in the second part. As another example, a reaction of a compound in the first part may be accelerated by a catalyst in the second part. The reaction may be any reaction that increases the viscosity of the matrix phase. Preferably, the reaction includes a polymerization reaction, a cross-linking reaction, or both. In some applications, the thermal interface material is contacted with a temperature sensitive component and it is desirable to avoid heating the compo-nent to a temperature at which it can degrade or lose performance. Preferably, the reaction is capable of proceed-ing at a reaction temperature of about 50° C. or less, about 40° C. or less, about 30° C. or less, or about 23° C. or less. Preferable, the reaction is capable of proceeding at a reaction temperature of about −10° C. or more, about 0° C. or more, or about 10° C. or more. For example, the reaction may occur at about room temperature (e.g., about 23° C.). If the reaction is exothermic, the increase in temperature due to this released energy typically is about 30° C. or less, about 20° C. or less, or about 10° C. or less. In some applications, it is desired for the reaction to occur quickly (e.g., in a time of about 1 hour or less). However, it is preferred that the reaction occurs over a longer period of time so that sharp temperature increases are avoided. Preferably, the reaction time may be about 30 minutes or more, more preferably about 1 hour or more, even more preferably about 4 hours or more, even more preferably about 8 hours or more, and most preferably about 24 hours or more. The reaction time typically is about 30 days or less, about 15 days or less, or about 7 days or less.

When the thermal interface material is provided as a two-part composition, the two parts may be combined at any convenient volume ratio. The volume ratio of the first part to the second part may be about 100:1 or less, about 10:1 or less, about 3:1 or less, about 2:1 or less, or about 1:1 or less. The volume ratio of the first part to the second part may be about 1:100 or more, about 1:10 or more, about 1:3 or more, about 1:2 or more, or about 1:1 or more. The first part and second part may be packaged separately. The first part and the second part may be packaged in a single container, typically with the two parts separated to avoid contact and/or mixing prior to use.

The thermal interface material typically has a specific gravity of about 1.50 or more, or about 1.8 or more, due to the filler in the composition. In some applications, such as in transport, it may be desirable for the thermal interface material to be light weight. Preferably, the thermal interface material has a specific gravity of about 4.0 or less, more preferably about 3.0 or less, even more preferably about 2.5 or less, even more preferably about 2.4 or less, and most preferably about 2.3 or less.

Fillers

The compositions according to the teachings herein include one or more fillers for increasing the thermal con-ductivity of the composition. Although the filler may include an ultra high conductivity filler (e.g., a filler having a thermal conductivity of about 100 W/mK), such fillers are typically abrasive and/or expensive. Preferably, the one or more fillers includes, consists essentially of, or consists entirely of one or more conductive fillers having thermal conductivity of about 80 W/mK or less, about 50 W/mK or less, about 30 W/mK or less, about 20 W/mK or less, or about 15 W/mK or less. The conductive filler preferably has a thermal conductivity of about 3 W/mK or more, about 4 W/mK or more, about 5 W/mK or more, or about 6 W/mK or more. The conductive filler may be characterized by a thermal conductivity of about 10+/−10%, about 10+/−20%, or about 10+/−30%. Preferably, the amount of ultra high conductivity filler in the composition is about 15 weight percent or less, more preferably about 4 weight percent or less, even more preferably about 1 weight percent or less, and most preferably about 0.3 weight percent or less, based on the total weigh of the one or more fillers. The amount of ultra high conductivity filler in the composition may be about 0.0 percent or more, based on the total weight of the one or more fillers. The amount of the conductive filler (i.e., excluding ultra high conductivity filler) may be about 80 weight percent or more, about 85 weight percent or more, about 90 weight percent or more, about 93 weight percent or more, about 96 weight percent or more, about 98 weight percent or more, about 99 weight percent or more, or about 99.7 weight percent or more, based on the total weight of the one or more fillers. The amount of the conductive filler may be about 100 weight percent or less, based on the total weight of the one or more fillers.

The ultra high conductivity filler, if present, may be any filler have a thermal conductivity of about 100 W/mK. Examples of ultra high conductivity fillers include boron nitrides and aluminum powder.

The conductive filler may be any filler having a thermal conductivity such as described herein. For example, the conductive filler may have a thermal conductivity of about 3 W/mK to about 80 W/mK. The conductive filler preferably is non-abrasive (e.g., is less abrasive than boronnitride, less abrasive than aluminum powder, or both). An example of a non-abrasive conductive filler is aluminum hydroxide (i.e., ATH) powder. Aluminum hydroxide powder has a thermal conductivity between 3 and 80 W/mK (typically about 10 W/mK).

The conductive filler typically includes one or more metal or metalloid atoms and one or more atoms that is a nonmetal. Metalloid atoms include boron, silicon, germanium, arsenic, antimony, and tellurium. Preferred metal atoms include alkali metals, alkaline earth metals, transition metals, and post-transition metals. The amount of nonmetal atoms in the conductive filler should be sufficiently high so that the conductive filler is not hard and abrasive. Examples of metal or metalloid containing fillers that are hard and abrasive include SiC, TiC, and BN. These hard and abrasive fillers include 50 atomic percent of the metal or metalloid. Pref-erably the concentration of the nonmetal atoms in the conductive filler is more than about 50 atomic percent nonmetal atoms, more preferably about 65 percent or more, even more preferably about 75 percent or more, and most preferably about 80 percent or more, based on the total number of atoms in the conductive filler. The concentration of the nonmetal atoms may be about 95 atomic percent or less, about 93 atomic percent or less, about 90 atomic percent or less or about 88 atomic percent or less. The conductive filler preferably has a sufficient concentration of metal atoms so that the thermal conductivity is about 3 W/mK. The combined concentration of any metal and metalloid in the conductive filler preferably is about 5 atomic percent or more. The combined concentration of any metal and metalloid in the conductive filler may be less than 50 atomic percent, about 35 atomic percent or less, about 25 atomic percent or less, or about 20 atomic percent or less.

Preferred compositions include a sufficient amount of the conductive filler so that the thermal conductivity of the composition is about 1.5 W/mK or more, preferably about 2.0 W/mK or more, more preferably about 2.5 W/mK or more, and most preferably about 3.0 W/mK or more. The thermal conductivity of the composition is typically about 10 W/mK or less, about 7 W/mK or less, or about 5 W/mK or less, measured according to ASTM 5470-12 on a therma interface material tester from ZFW Stuttgart, with tests performed in Spaltplus mode at a thickness of between 1.8-1.2 mm; the described thermal interface material is considered as Type I (viscous liquids) as described in ASTM 5470-12, the upper contact is heated to ca 40° C. and the lower contact to ca 10° C., resulting in a sample temperature of ca 25° C.

The A and B component are mixed with a static mixer when applied from a manual cartridge system. If the amount of the conductive filler is too low, the composition will not be able to conduct heat sufficiently for managing the temperature of a device. In order to achieve such high thermal conductivity of the composition, the composition typically has high concentrations of the conductive filler. Preferably, the amount of the conductive filler in the composition is about 60 weight percent or more, more preferably about 70 weight percent or more, even more preferably about 75 weight percent or more, even more preferably about 80weight percent or more, even more preferably about 85 weight percent or more, and most preferably about 88 weight percent or more, based on the total weight of the composition. The amount of the conductive filler in the composition should be sufficiently low so that the conductive filler can be dispersed in the matrix. Typically, the amount of conductive filler is about 95 weight percent or less, more preferably about 92 weight percent or less, based on the total weight of the composition.

The conductive filler preferably has a sufficiently low Mohs hardness so that it is generally non-abrasive. Preferably, the conductive filler has a Mohs hardness of about 7.0 or less, preferably about 5.0 or less, and more preferably about 4.0 or less. The conductive filler may have a Mohs hardness of about 0.5 or more, about 1.5 or more, or about 2.0 or more.

The conductive filler typically includes M-X bonds, where M is a metal and X is a non-metal. Preferably the ratio of the M-X bonds to the M-M bonds (metal-metal bonds) in the filler may be about 2.0 or more, about 3.0 or more, or about 4.0 or more. It will be appreciated, that the conductive filler may be free of M-M bonds. An example of a conductive filler that is generally free of M-M bonds is aluminum hydroxide.

The one or more fillers in the composition preferably has an average specific gravity of about 3.5 or less, more preferably about 3.0 or less, even more preferably about 2.8 or less, even more preferably about 2.6 or less and most preferably about 2.5 or less. The average specific gravity of the one or more fillers may be about 1.8 or more, about 2.2 or more, or about 2.4 or more. The average specific gravity of a fillers including a mass fraction $m_a$ of filler A having specific gravity $v_a$ and a mass fraction $m_b$ of filler B having a specific gravity $v_b$ (where $m_a+m_b=1$) is defined as:

$$1/[(m_a/v_a) + (m_b/v_b)].$$

In addition to the thermally conductive filler, other fillers may include calcium carbonate and/or calcium oxide. If employed, the total amount of the calcium carbonate and the calcium oxide preferably is about 20 weight percent or less, more preferably about 10 weight percent or less, and most preferably about 5 weight percent, based on the total weight of the one or more fillers. The total amount of the calcium carbonate and the calcium oxide may be about 0 weight percent or more, about 0.4 weight percent or more, or about 0.8 weight percent or more, based on the total weight of the one or more fillers in the composition (e.g., in the two part composition).

Preferred fillers are selected from aluminum hydroxide, aluminium oxide, aluminium powder, zinc oxide, boron nitride, and mixtures of these. Particularly preferable the filler is selected from aluminium hydroxide, aluminium oxide and mixtures of these. Most particularly preferred is aluminium hydroxide.

Particle Size Distribution

In order to achieve a combination of high thermal conductivity of the composition and ability to mix and process the composition, the conductive filler preferably has a broad particle size distribution.

The broad particle size distribution may allow the particles to more efficiently pack together. The particle size distribution may be characterized by $D_{10}$, $D_{50}$, and $D_{90}$, corresponding to the $10^{th}$ percentile, $50^{th}$ percentile (median), and $90^{th}$ percentile of the particle sizes. Particle size is measured according to ISO 13320, using a $2.24 \times 10^{-3}$ M solution of Tetrasodium pyrophosphate decahydrate (1 g $Na_4P_2O_7 \cdot X10H_2O$ in 1000 ml deionized water) as dispersion medium.

Filler having a broad particle size distribution may be characterized by one or more of the following: a generally high ratio of $D_{90}/D_{50}$, a generally high ratio of $D_{90}/D_{10}$, or a generally high ratio of $D_{50}/D_{10}$, or any combination thereof. Preferably, the ratio of $D_{90}/D_{50}$ is about 3 or more, about 4 or more, about 5 or more, about 6 or more or about 8 or more. The ratio of $D_{90}/D_{50}$ may be about 100 or less or about 40 or less. Preferably the ratio of D90/D10 is about 20 or more, about 40 or more, about 60 or more, or about 80 or more. The ratio of $D_{90}/D_{10}$ may be about 1000 or less or about 400 or less. The ratio of $D_{90}/D_{50}$ may be about 100 or less or about 40 or less. Preferably the ratio of $D_{50}/D_{10}$ is about 8 or more, about 10 or more, or about 12 or more. The ratio of $D_{50}/D_{10}$ may be about 100 or less or about 40 or less. The large particles in the conductive filler (as characterized by the $D_{90}$ value) should be sufficiently high so that sites are created for packing one or more smaller particles. Preferably $D_{90}$ is about 10 μm or more, more preferably about 20 μm or more, even more preferably about 40 μm or more, and most preferably about 60 μm or more. If $D_{90}$ is too large, it may be difficult to process the composition. Preferably, $D_{90}$ is about 2000 μm or less, more preferably about 1000 μm or less and most preferably about 500 μm or less. The small particles (as characterized by the $D_{10}$ value) in the conductive filler should be sufficiently small so that they can fit in sites between large particles. Preferably, $D_{10}$ is about 4 μm or less, about 2 μm or less, or about 1 μm or less. Typically, it is difficult and costly to make very small particles. As such, it is preferable that $D_{10}$ is about 0.1 μm or more, or about 0.25 μm or more, although smaller particles may be employed. The conductive filler may have a first portion having an average particle size of about 10 μm or less, and a second portion having an average particle size of about 50 μm or more (preferably, the first and second portions are each present in an amount of about 25 weight percent or more, about 30 weight percent or more, or about 35 weight percent or more of the conductive filler).

FIG. 1 illustrates the effect of having a broad particle size distribution 6 (B) on the ability to pack small particles 7 between larger particles 8 as compared to a filler having a narrow particle size distribution 4 (A). With the increase in particle concentration using a broad particle size distribution, particles 2 are closer and there may be bridging between two particles by the matrix phase material 3. Adhesion of the matrix phase to the particle surface and/or bridging may reduce the ability to flow or process the composition. In order to improve processability, the particles preferably have surface modifier. For example (C) has a broad particle size distribution 6 and a coating 5 (e.g., of a surface modifier) to reduce or minimize the bonding between the matrix phase material and the filler.

Figure 2:
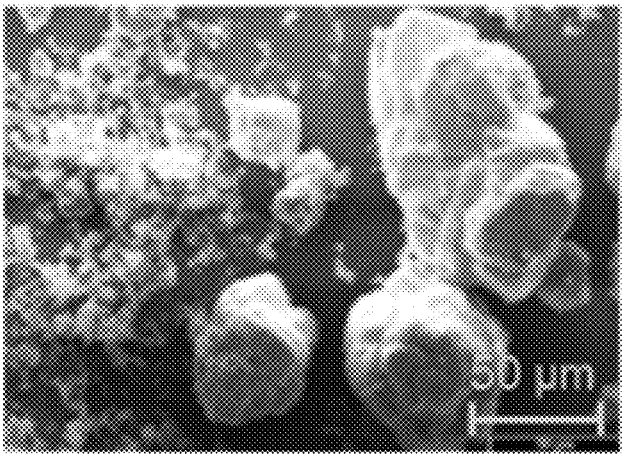
FIG. 2 is a drawing illustrating features of a reaction between a surface modifier and a conductive filer. For example, a surface modifier may change the hydrophobicity of the surface.

FIG. 2 is an optical micrograph of an example of a conductive filler, aluminum hydroxide (i.e., $Al(OH)_3$) having a broad particle size distribution.

Filler Surface Modifier

Although in many filled polymer systems, it is desirable to have good compatibility and/or bonding between the matrix phase and the filler phase, Applicant has determined that for these highly filled compositions, such compatibility and/or bonding may create bridges between neighboring filler particles that prevent the flow of the composition. It is preferred that the matrix phase material does not bond with a surface of the filler. For example, the covalent bonding, ionic bonding, and hydrogen bonding may be reduced, minimized or even completely avoided. This can be achieved by selection of the matrix phase material and conductive filler material. Alternatively, the filler material may be treated with one or more surface modifiers for reducing, minimizing or eliminating bonding with the matrix phase material.

The surface modifier may partially or completely cover the surface of the conductive filler particle. The surface modifier may have one or more functional groups that reacts with the conductive filler particle. As such, the surface modifier may be covalently bonded to the conductive filler. By way of example, the conductive filler may include M—OH groups, where M is a metal atom, and the surface modifier may include a functional group that reacts with the M—OH group to form a direct or indirect bond between the surface modifier and M.

Figure 3:
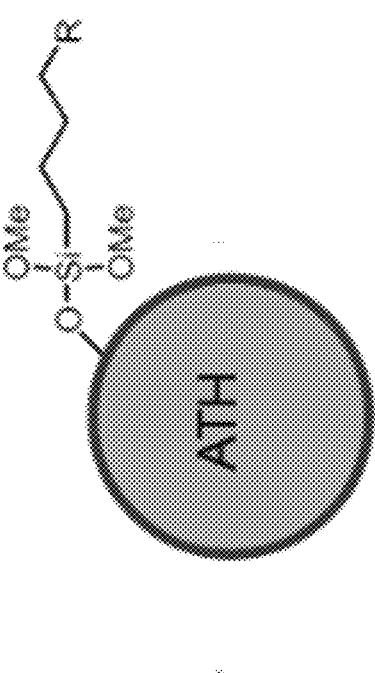
FIG. 3 is a drawing showing illustrative composition having different amounts of filler where the filler (A) has a narrow particle size distribution; (B) has a broad particle size distribution, and (C) has a broad particle size distribution and a surface modifier to reduce or minimize the bonding between the matrix phase material and the filler.
Figure 3:
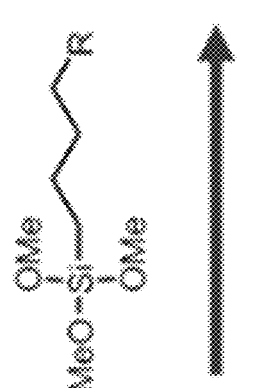
Figure 3:
Figure 3:
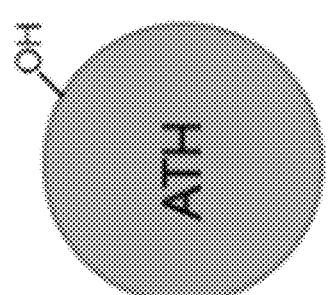

The surface of the conductive filler may be hydrophobized with the surface modifier. For example, the surface modifier may include an alkyl component and one or more functional group at or near one end of the alkyl component. The alkyl component preferably includes about 6 or more carbon atoms, more preferably about 8 or more carbon atoms, even more preferably about 10 or more carbon atoms, and most preferably about 12 or more carbon atoms. The one or more functional groups may be selected to react with surface of the conductive filler. For example, the one or more function groups may include one or more alkoxysilanes. Such a functional group may be particularly useful for bonding the surface modify to a conductive filler including M—OH groups, such as in aluminum hydroxide. An example of a reaction between a conductive filler and a surface modifier is shown in FIG. 3.

It will be appreciated that the surface modifier may be added to the filler before or after mixing the conductive filler with the matrix phase material. For example, the conductive filler may be coated and/or reacted with the surface modifier prior to mixing the conductive filler and the matrix phase material. As another example, the surface modifier may be mixed with the matrix phase material to form a premix which is then combined with the conductive filler. As another example, the conductive filler and the matrix phase material may be mixed and then the surface modifier may be added to the mixture.

Matrix Phase

The matrix phase of the thermal interface material typically includes, consists essentially of, or consists entirely of one or more liquid materials. For example, the matrix phase of the first part, the second part, or both may include one or more materials that are liquid at room temperature. The amount of the liquid compounds in the first part, the second part, or both, preferably is about 50 weight percent or more, more preferably about 70 weight percent or more, even more preferably about 85 weight percent or more, even more preferably about 95 weight percent or more, and most preferably about 98 weight percent or more, based on the total weight of the matrix phase of the part. The amount of the liquid compounds in the first part, the second part, or both, may be about 100 weight percent or less, based on the total weight of the matrix phase of the part. As the matrix phase is preferably a minor phase (i.e., present in amount of about 50 volume percent or less of the composition) the amount of the liquid compounds in the first part, the second part, or both is preferably about 50 volume percent or less, based on the total weight of the part. The one or more liquids should be present in an amount sufficient so that each part can be mixed without crumbling. Preferably, the weight percent of the one or more liquid compounds in the first part, the second part, or both is about 3 weight percent or more, about 5 weight percent or more, or about 7 weight percent or more, based on the total weight of the part. The one or more liquids should be present in an amount sufficiently low so that the separation between filler particles is reduced and the thermal conductivity of the part or the entire composition is about 2.0 W/mK or more, about 2.5 W/mK or more, about 2.8 W/mK or more, about 2.9 W/mK or more, or about 3.0 W/mK or more, measured according to ASTM 5470-12 on a therma interface material tester from ZFW Stuttgart, with tests performed in Spaltplus mode at a thickness of between 1.8-1.2 mm; the described thermal interface material is considered as Type I (viscous liquids) as described in ASTM 5470-12, the upper contact is heated to ca 40° C. and the lower contact to ca 10° C., resulting in a sample temperature of ca 25° C. Preferably, the one or more liquid compounds in the first part, the second part, or both is about 30 weight percent or less, more preferably about 25 weight percent or less, even more preferably about 20 weight percent or less, even more preferably about 15 weight percent or less, and most preferably about 13 weight percent or less, based on the total weight of the part.

The total amount of the matrix phase in the thermal interface material (e.g., after mixing the first and second parts, and optionally after reacting the two parts), preferably is about 30 weight percent or less, more preferably about 25 weight percent or less, even more preferably about 20 weight percent or less, even more preferably about 15 weight percent or less, and most preferably about 13 weight percent or less, based on the total weight of the composition. The total amount of the matrix phase in the thermal interface material (e.g., after mixing the first and second parts, and optionally after reacting the two parts), preferably is about 3 weight percent or more, more preferably about 5 weight percent or more, even more preferably about 7 weight percent or more, and most preferably about 8 weight percent or more, based on the total weight of the composition.

The first part (i.e., the carbamate-containing part) includes one or more carbamate-containing compounds. The carbamate-containing compound may be any compound including a carbamate group, and preferably including two or more spaced apart carbamate groups. Spaced apart carbamate groups are typically separated by 6 or more, 10 or more, or 15 or more atoms on the backbone of the compound. The carbamate-containing compound may be a monomer, an oligomeric compound. An oligomeric compound may be a prepolymer. The carbamate-containing compound may be prepared by reacting an isocyanate-containing compound with a phenol-containing compound to form the carbamate group. The carbamate-containing com It will be appreciated that a carbamate-containing compound including two or more carbamate groups may be formed by i) reacting isocyanate groups in an isocyanate-containing compound with a phenol-containing compound having a single phenol group, where the isocyanate-containing compound includes two or more spaced apart isocyanate groups; or ii) reacting each phenol group in a phenol-containing compound with an isocyanate-containing compound having a single isocyanate group, where the phenol-containing compound includes two or more spaced apart phenol groups. Typically, the spaced apart isocyanate groups or the spaced apart phenol groups are separated by 6 or more, 10 or more, or 15 or more atoms on the backbone of the compound.

The first part and/or the entire two-part composition preferably is substantially free of isocyanate-containing compounds so that the part and composition have good shelf life stability. Without being bound by theory, it is believed that the high concentration of filler and/or amounts of water in the filler may result in polymerization and/or cross-linking of the isocyanate-containing compound, resulting in an increase in the viscosity or even setting of the first part. Preferably the amount isocyanate groups in the first part preferably is about 0.10 weight percent or less, more preferably about 0.05 weight percent or less, even more preferably about 0.01 weight percent or less, and most preferably about 0.005 weight percent or less, based on the total weight of the first part, or based on the total weight of the matrix phase of the first part. The first part may even be total free of isocyanate groups. The molar ratio of isocyanate groups to carbamate groups in the first part preferably is about 0.35 or less, more preferably about 0.20 or less, even more preferably about 0.10 or less, even more preferably about 0.03 or less, and most preferably about 0.01 or less. The molar ratio of isocyanate groups to carbamate groups in the first part may be about 0.00 or more.

The carbamate-containing compound preferably has an equivalent weight (i.e., molecular weight divided by number of carbamate groups) of about 10,000 g/equivalent or less, more preferably about 7,000 or less, even more preferably about 4,000 or less, even more preferably about 3,000 or less, and most preferably about 2,000 or less. The carbamate-containing compound may have an equivalent weight of about 300 g/equivalent or more, about 500 g/eq or more, or about 700 g/eq or more. The carbamate-containing compound preferably has a number average molecular weight of about 20,000 g/mole or less, more preferably about 10,000 or less, even more preferably about 7,000 or less, even more preferably about 6,000 or less, and most preferably about 5,000 or less. The carbamate-containing compound preferably has a number average molecular weight of 500 g/mole or more, about 1000 g/mole or more, or about 1,500 g/mole or more. Molecular Weight can be measured by gel permeation chromatography (GPC), for example with a Malvern Viscothek GPC max equipment. Tetrahydrofuran (THF) is preferably used as an eluent, PL GEL MIXED D (Ailent, 300*7.5 mm, 5 μm) may be used as a column, with refractive index and/or light scattering detectors. For example, a MALVERN Viscotek TDA may be used as a detector.

The carbamate-containing compound may be prepared by reacting an isocyanate-containing compound including one or more isocyanate groups with a phenol-containing compound including one or more phenol groups, wherein the resulting compound includes two or more carbamate groups. The isocyanate-containing compound may be a be a prepolymer. An isocyanate containing prepolymer may be formed by reacting a diisocyanate compound with a polyol, where excess isocyanate is used so that essentially all of the polyol is reacted. The diisocyanate may include an aromatic isocyanate, an aliphatic isocyanate or both. Preferably, the diisocyanate includes or consists essentially of an aromatic diisocyanate. It will be appreciated that the diisocyanate may be replaced by a compound including more than two isocyanate groups. The polyol preferably is a polyether polyol. The polyol may have two or more OH groups. It will be appreciated that instead of using a prepolymer, the phenol-containing compound may be reacted directly with the diisocyanate. The phenol-containing compound typically has a linear hydrocarbon attached to the phenol group to provide some aliphatic characteristics to the compound. The linear hydrocarbon preferably includes about 3 or more carbon atoms, more preferably about 5 or more carbon atoms, even more preferably about 8 or more carbon atoms, and most preferably about 10 or more carbon atoms. The linear hydrocarbon preferably includes about 50 or less carbon atoms, about 30 or less carbon atoms, about 24 or less carbon atoms, or about 18 or less carbon atoms. The phenol-containing compound preferably is a lipid.

An example of a carbamate containing-compound is a reaction product of an aromatic polyisocyanate prepolymer (based on toluene diiosoyanate reacted with a polyether polyol, having an NCO content of about 4-5% and an equivalent weight of about 500-1500 g/eq) and phenol-containing lipid (such as cardanol). The compounds are preferably reacted in the presence of a catalyst, heat, and an inert atmosphere. The reaction temperature preferably is about 30° C. or more, more preferably about 40° C. or more. The reaction temperature is preferably about 130° C. or less, more preferably about 100° C. or less. The catalyst may be a Lewis acid or a Lewis base catalyst. A particularly preferred catalyst is a tin catalyst, particularly preferred is dioctyltin dineodecanoate, or an amine catalyst, particularly a tertiary amine catalyst, for example DABCO (1,4-diazabicyclo[2.2.2]octane).

The carbamate-containing compound may be a blocked isocyanate compound, where the isocyanate groups are blocked by phenol groups to form carbamate groups. Although such blocked isocyanate groups (i.e., isocyanate groups that have been converted into a carbamate group) may be unblocked by heating, it may be desirable to avoid heating the two-part composition after the parts are mixed and contacted with a device (e.g., a heat generating device). As such, it may be desirable to react the carbamate group with a compound of the second part, without unblocking the compound (i.e., without forming isocyanate groups). Therefore, the second part preferably includes one or more carbamate-reactive compounds capable of reacting with the carbamate groups for polymerizing or cross-linking at least the carbamate-containing compound. The carbamate-reactive compound may react with the carbamate groups to increase the viscosity of the composition.

The carbamate-reactive compound may include any carbamate-reactive groups capable reacting with the carbamate group. Preferably the carbamate-reactive compound includes one or more amine groups. The amine groups may be any amine group (primary, secondary, or tertiary), preferred amine groups are primary and secondary amines, and most preferred amine groups are primary amines. The carbamate-reactive compound preferably is a polyamine including two or more amine groups. For example, the carbamate-reactive compound may include a first polyamine having two amine groups and a second polyamine having more than two amine groups. The amine groups of the polyamine are typically spaced apart by two or more backbone atoms (i.e., atoms defining the shortest covalent connection between the two groups). Preferably each amine group is spaced apart from the other amine group(s) by 5 or more backbone atoms, more preferably about 6 or more backbone atoms, even more preferably about 8 or more backbone atoms, and most preferably about 10 or more backbone atoms.

The carbamate-reactive component (e.g., the second part) may include one or more polyols. However, any reaction between the polyol and the first component may be minimal, particularly for applications where the heating of the composition (e.g., after mixing) to a temperature of about 60° C. or more (or about 100° C. or more) is avoided. If polyol is present in the second part, the molar ratio, of the hydroxyl groups (e.g., of the polyol) to the amine groups (e.g., of the polyamine) preferably is about 1.5 or less, more preferably about 0.9 or less, even more preferably about 0.6 or less, and most preferably about 0.3 or less. The molar ratio o hydroxyl groups to amine groups in the second part may be about 0.0 or more, or about 0.01 or more.

Surface Modifier (for the Filler)

Although in many filled polymer systems, it is desirable to have good compatibility and/or bonding between the matrix phase and the filler phase, it has surprisingly been determined that for these highly filled compositions, such compatibility and/or bonding may create bridges between neighboring filler particles that prevent the flow of the composition. It is preferred that the matrix phase material does not bond with a surface of the filler. For example, the covalent bonding, ionic bonding, and hydrogen bonding may be reduced, minimized or even completely avoided. This can be achieved by selection of the matrix phase material and conductive filler material. Alternatively, the filler material may be treated with one or more surface modifiers for reducing, minimizing or eliminating bonding with the matrix phase material.

The surface modifier may partially or completely cover the surface of the conductive filler particle. The surface modifier may have one or more functional groups that reacts with the conductive filler particle. As such, the surface modifier may be covalently bonded to the conductive filler. By way of example, the conductive filler may include M—OH groups, where M is a metal atom, and the surface modifier may include a functional group that reacts with the M—OH group to form a direct or indirect bond between the surface modifier and M.

The surface of the conductive filler may be hydrophobized with the surface modifier. For example, the surface modifier may include an alkyl component and one or more functional group at or near one end of the alkyl component. The alkyl component preferably includes about 6 or more carbon atoms, more preferably about 8 or more carbon atoms, even more preferably about 10 or more carbon atoms, and most preferably about 12 or more carbon atoms. The one or more functional groups may be selected to react with surface of the conductive filler. For example, the one or more function groups may include one or more alkoxysilanes. Such a functional group may be particularly useful for bonding the surface modify to a conductive filler including M—OH groups, such as in aluminum hydroxide. An example of a reaction between a conductive filler and a surface modifier is shown in FIG. 3.

It will be appreciated that the surface modifier may be added to the filler before or after mixing the conductive filler with the matrix phase material. For example, the conductive filler may be coated and/or reacted with the surface modifier prior to mixing the conductive filler and the matrix phase material. As another example, the surface modifier may be mixed with the matrix phase material to form a premix which is then combined with the conductive filler. As another example, the conductive filler and the matrix phase material may be mixed and then the surface modifier may be added to the mixture.

As illustrated in FIG. 4(A), when a conductive filler having a narrow particle size distribution is employed, the resulting composition may have a rough surface even when the filler loading is low, (e.g., only about 60 weight percent). As illustrated in FIG. 4(B), the ability to increase the filler loading is improved by using a filler having a broad particle size distribution. As illustrated in FIG. 4(C), the ability to increase the filler loading is further improved by using a filler having a broad particle size distribution and also adding a surface modifier that reduces, minimizes or eliminates bonding between the matrix phase material and the filler particles.

Catalyst

The composition preferably includes one or more catalysts for accelerating a reaction between a carbamate-containing compound and a carbamate-reactive compound (such as a polyamine containing compound). The catalyst may include a Lewis acid or a Lewis base catalyst. The Lewis acid catalyst may be an organometallic compound, preferably including one or more aliphatic groups. Each aliphatic group preferably includes four or more, six or more, or eight or more carbon atoms. The organometallic compound preferably is a tin compound. An example of a tin-containing Lewis acid catalyst is dioctyltin dineodecanoate. The one or more catalysts may include an amine catalyst. The amine catalyst preferably includes may include an aliphatic group, an aromatic group, or both. Examples of amine catalysts are tris-2,4,6-dimethylaminomethyl phenol or DABCO (1,4-diazabicyclo[2.2.2]octane). The catalyst should be employed in an amount sufficient for accelerating the reaction between the carbamate containing compound and the polyamine. Preferably the amount of the catalyst is about 0.05 weight percent or more, more preferably about 0.10 weight percent or more, even more preferably about 0.20 weight percent or more, even more preferably about 0.4 weight percent or more, and most preferably about 0.75 weight percent or more, based on the total weight of the matrix phase in the total composition (or based on the total weight of liquid materials int eh composition). Preferably, the amount of the catalyst is about 10 weight percent or less, more preferably about 8 weight percent or less, even more preferably about 5 weight percent or less, and most preferably about 4 weight percent or less, based on the total weight of the matrix phase in the total composition (or based on the total weight of liquid materials in the composition).

The catalyst may be provided in the first part, the second part, or both. As one example, the first part and the second part may each contain both an amine catalyst and an organometallic catalyst (e.g., a tin-containing Lewis acid catalyst). As another example, one part (e.g., the first part or the second part) may include an organometallic catalyst (e.g., a tin-containing Lewis acid catalyst) and the other part may include an amine catalyst. As another example the first part and the second part may both include an organometallic catalyst (e.g., a tin-containing Lewis acid catalyst) which may be the same or different.

Preferred catalysts are liquid at room temperature.

Plasticizer

The first part, the second part, or both parts may include one or more plasticizers. The plasticizer preferably is a compound that does not react with the carbamate group of the first part. The plasticizer preferably is a compound that does not react with an amine group of the second part. The plasticizer is a liquid at room temperature and forms a portion of the matrix phase. The plasticizer may be present in the first part, the second part, or both, an amount of about 0 weight percent or more, preferably about 10 weight percent or more, more preferably about 20 weight percent or more, and most preferably about 25 weight percent or more, based on the total weight of the matrix phase of the part. The plasticizer may be present in the first part, the second part, or both, an amount of about 75 weight percent or less, preferably about 65 weight percent or less, more preferably about 60 weight percent or less, and most preferably about 55 weight percent or less, based on the total weight of the matrix phase of the part.

Preferred plasticizers have a weight average molecular weight of about 2,000 g/mole or less, more preferably about 1,000 g/mole or less, even more preferably about 800 g/mole or less, and most preferably about 600 g/mole or less. The plasticizer is a liquid at a temperature of about 100° C. Preferred plasticizers have a molecular weight of about 125 g/mole, more preferably about 175 g/mole, and most preferably about 225 g/mole.

Colorant

The composition may optionally include a dye, pigment, or other colorant for providing a predetermined color to the composition. The colorant, if employed may be included in the first part, the second part, or both. The colorant typically is present in an amount of about 1 weight percent or less, about 0.5 weight percent or less, or about 0.2 weight percent or less, based on the total weight of the two-part composition. The colorant may be provided as a neat material or may be mixed with a carrier material (typically a carrier liquid). The carrier material preferably is a material described herein for use in the first part and/or the second part. For example, the carrier material may be an epoxy resin, a carbamate-containing compound, a plasticizer, polyol, a catalyst, a carbamate-reactive compound, or a surface modifier; according to the teachings herein.

The matrix phase (e.g., as defined by the liquid compounds, and/or the composition including the filler) of the first part preferably includes a substantial amount of the carbamate-containing compound. Preferably the amount of the carbamate-containing compound in the first part is about 10 weight percent or more, more preferably about 15 weight percent or more, and most preferably about 18 weight percent or more, based on the total weight of the liquid compounds in the first part. The amount of the carbamate-containing compound in the first part may be about 90 weight percent or less, about 80 weight percent or less, about 70 weight percent or less, about 60 weight percent or less, or about 50 weight percent or less, based on the total weight of the liquid compounds in the first part.

The matrix phase (e.g., as defined by the liquid compounds, and/or the composition including the filler) of the second part preferably includes a substantial amount of the carbamate-reactive compound (e.g., the polyamine). Preferably the amount of the carbamate-reactive compound in the second part is about 10 weight percent or more, more preferably about 15 weight percent or more, even more preferably about 20 weight percent or more, and most preferably about 25 weight percent or more, based on the total weight of the liquid compounds in the second part. The amount of the carbamate-reactive compound (e.g., polyamine) in the second part may be about 90 weight percent or less, about 80 weight percent or less, about 70 weight percent or less, about 60 weight percent or less, or about 50 weight percent or less, based on the total weight of the liquid compounds in the second part.

The total amount of the carbamate-containing compound, the one or more catalysts, the carbamate-reactive compound, the surface modifier, the one or more fillers, and the plasticizer preferably is about 95 weight percent or more, more preferably about 97 weight percent or more, even more preferably about 98 weight percent or more, even more preferably about 99 weight percent or more, and most preferably about 99.5 weight percent or more, based on the total weight of the composition. The total amount of the carbamate-containing compound, the one or more catalysts, the polyamine compounds, the alkoxysilane surface modifier, the ATH, the optional calcium carbonate and calcium oxide, and the plasticizer preferably is about 95 weight percent or more, more preferably about 97 weight percent or more, even more preferably about 98 weight percent or more, even more preferably about 99 weight percent or more, and most preferably about 99.5 weight percent or more, based on the total weight of the composition.

A molar ratio of the carbamate groups in the first part to the amine groups in the second part preferably is about 0.1 or more, about 0.2 or more, about 0.3 or more, about 0.4 or more, about 0.5 or more, or about 0.6 or more. A molar ratio of the carbamate groups in the first part to the amine groups in the second part preferably is about 10 or less, about 5.0 or less, about 3.5 or less, about 2.5 or less, about 2.0 or less, or about 1.7 or less.

Gap Filling Properties

The two-part composition should be able to fill a gap between components and provide for a thermally conductive path between the two components. Typically, the two-part composition, after mixing (i.e., the thermal interface material), is placed on one of the components and then the other component is pressed into the mixture. Each of the two-parts of the thermal interface material preferably has a sufficiently low viscosity so that the material can be mixed with the other part and a component can easily be pressed into the mixture. The two-part composition, after mixing, should have a sufficiently high viscosity so that the mixture does not flow away from the region in which it is applied (e.g., before pressing the second component into the mixture). The viscosity of one of the parts or of the mixture may be characterized by a PRESS-IN FORCE, as herein. Preferably the first part, the second part, the mixture, or any combination thereof is characterized by a press-in force (initial, measured at 23° C.) of about 1000 N or less, about 900 N or less, about 800 N or less, about 700 N or less, about 600 N or less, about 500 N or less, or about 400 N or less. Preferably the first part, the second part, the mixture, or any combination thereof is characterized by a press-in force (initial, measured at 23° C.) of about 5 N or more, about 10 N or more, about 30 N or more, about 60 N or more, about 80 N or more, about 90 N or more, or about 100 N or more.

Shelf Stability

The materials according to the teachings herein may be required to be shelf stable at room temperature and/or at shipping temperatures. The shelf stability of the material may be characterized by accelerated testing whereby the material is exposed to a temperature of about 55° C. for 3 days. Preferably, each part of the two-part composition maintains its good viscosity even after aging at about 3 days at a temperature of about 55° C., prior to mixing. In particular, the first part, the second part, or both should be selected so that there is little or no increase in viscosity after aging for 3 days at 55° C. Preferably each part is characterized by a ratio of the press-in force after aging (e.g., 3 days at 55° C.) to an initial press-in force of about 4.0 or less, about 3.0 or less, about 2.0 or less, about 1.5 or less, or about 1.3 or less. Typically, the ratio of the press-in force after aging to the initial press-in force is about 0.5 or more, 0.75 or more, or about 1.0 or more; however, values of 0.5 or less are also possible. After aging (e.g., 3 days at 55° C.), the press-in force of the first part, the second part, or both, preferably is about 1000 N or less, about 900 N or less, about 800 N or less, about 700 N or less, about 600 N or less, about 500 N or less, or about 400 N or less.

Applications

Figures 4, 5:
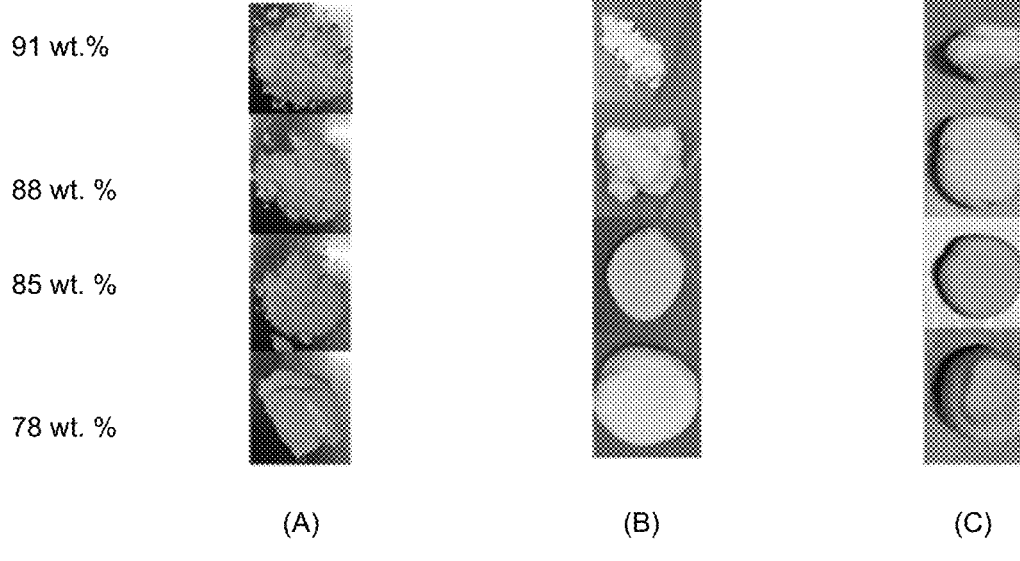
FIG. 4 is an optical micrograph of an illustrative conductive filler having a broad particle size distribution.
FIG. 5 is a drawing showing illustrative features of a device including a thermal interface material.

The thermal interface material according to the teachings herein may be used in any device or system requiring polymeric or oligomeric material having good thermal conductivity. FIG. 5 is a drawing of illustrating features of a device 10 including a thermal interface material 12. The device may require heat flow 20 from a first component 14 of the device, to a second component 16 of the device 10. As illustrated in FIG. 5, the heat flow may go through the thermal interface material 12. The second component 16 of the device may have a surface 20 (internal or external) that allows for removal of heat from second component.

The thermal interface material may be used as a gap fill material. The thermal interface material may be used as a sealing material. In some applications, it may be necessary to apply thin layers of the thermal interface material (e.g., about 2 mm or less, about 1 mm or less, about 0.5 mm or less or about 0.3 mm or less). As such, the thermal interface material preferably has a low viscosity and/or has a good mixing behavior (e.g., having a smooth appearance that does not crumble after mixing) so that thin regions or layers may be prepared.

Figure 6:
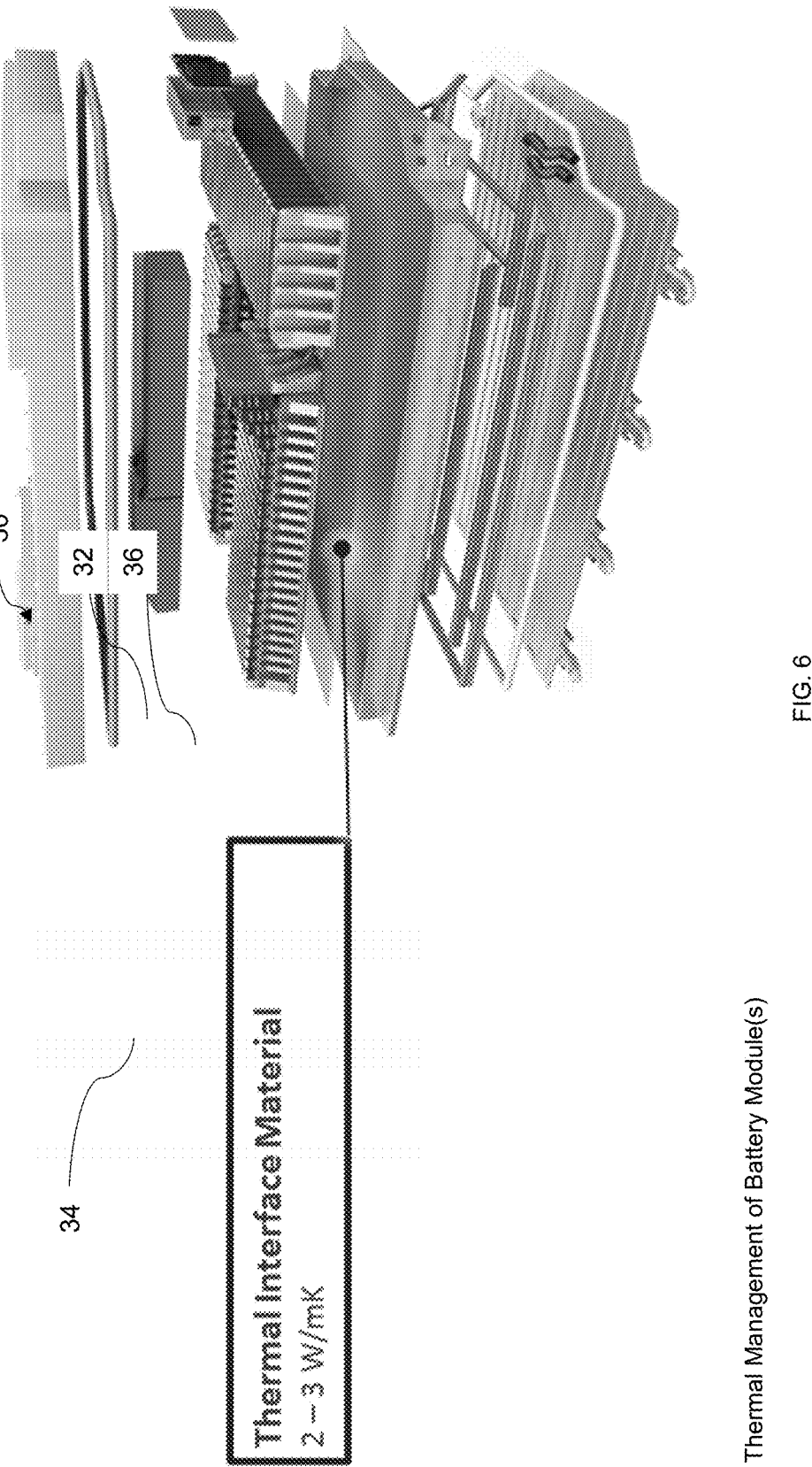
FIG. 6 is an illustrative drawing of a battery including a thermal interface material.
Figure 7:
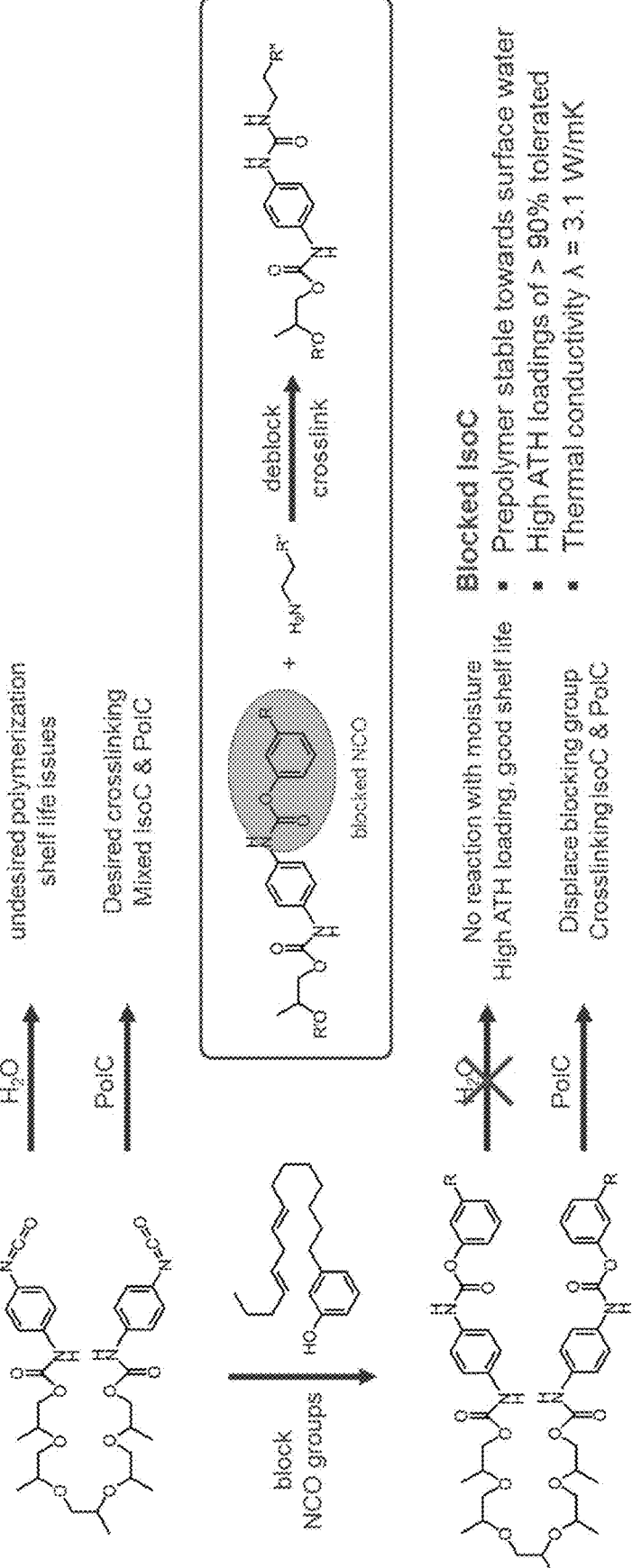
FIG. 7 is a drawing illustrating various chemical reactions which may be employed or avoided according to the teachings herein.

Article including one or more battery cells, a cell cover having a surface for contacting with a cooling unit or with a circulating cooling fluid, preferably have a thermal interface material interposed between the battery cell and the cell cover. The thermal interface material provides a path for conducting thermal energy from the battery cell to the cell cover for managing the temperature of the battery cell. The battery cells may be provided as one or more modules. Without the thermal interface material, there may be a gap (at least in some regions) between the battery module and a conductive plate (e.g., of a housing). FIG. 6 is a drawing illustrating features that may be employed in thermal management of one or more battery modules. The battery/ thermal management system 30 includes a thermal interface material 32 for filling a gap between one or more battery modules 34 and a metal surface 36. The thermal interface material may be applied by placing on a surface of the battery modules or by placing on the metal surface. The metal surface may be a cooling plate or other component arranged for drawing heat out of the system.

Test Methods

Particle size distribution.

Unless otherwise stated, the particle size distribution of the filler is measured by laser diffraction in acetone.

Thermal Conductivity

Thermal conductivity is measured according to ASTM 5470-12 on a therma interface material tester from ZFW Stuttgart. The tests are performed in Spaltplus mode at a thickness of between 1.8-1.2 mm. The described thermal interface material is considered as Type I (viscous liquids) as described in ASTM 5470-12. The upper contact is heated to ca 40° C. and the lower contact to ca 10° C., resulting in a sample temperature of ca 25° C. The A and B component are mixed with a static mixer when applied from a manual cartridge system. This is the method that is used in the Examples of the present application.

Press-In Force

The press-in force is measured with a tensiometer (Zwick). The composition (e.g., the gap filler material) is placed on a metal surface. An aluminum piston with a diameter of about 40 mm diameter is placed on top and the material is compressed to an initial position of 5 mm. The material is then compressed from 5 mm to 0.3 mm at a velocity of about 1 mm/s velocity and force deflection curve is recorded. The force (N) at 0.5 mm thickness is then reported in the datatable and considered as the press-in force. A material having a low viscosity has a press-in force of 700 N or less. A high viscosity material has a press-in force greater than 700 N, or about 800 N or more. A material having a low viscosity preferably has a press-in force of about about 600 N or less, even more preferably about 500 N or less, and most preferably about 400 N or less.

Mixing Ability

The ability to mix the composition was determined by the ability to create a single mass of material having a smooth surface. Such materials having "good" mixing. When the surface is rough and/or the material crumbles upon removing from the mixer, the mixing is poor.

| MATERIALS | |
| --- | --- |
| Polyisocyanate Prepolymer -1 | An aromatic polyisocyanate prepolymer based on toluene diisocyanate (TDI). NCO content is about 4.2 to 4.6% (ISO 11909). Viscosity is about 6,000 to 8,000 (ISO 3219/A3). Equivalent weight is about 950. Reaction product of TDI and a polyether polyol. |
| Polyisocyanate Prepolymer -2 | An aliphatic polyisocyanate prepolymer based on hexamethylene diisocyanate (HDI). NCO content is about 6.6% (ISO 11909). Reaction product of HDI and a polyether polyol. |
| Cardanol | Cardanol is a phenolic lipid obtained from cashew nut having a terminal phenol group attached to a linear $C_{15}$ hydrocarbon (typically including a combination of two or more of: tri-unsaturated, bi-unsaturated, mono-unsaturated, and saturated $C_{15}$ groups). Approximately: $Ph\text{-}C_{15}H_{27}$. |

-continued

| MATERIALS | |
|---|---|
| Carbamate Prepolymer-1 | Reaction product of 22.1 wt. % cardanol; 77.85 wt. % Polyisocyane Prepolymer-1; and 0.05 wt. % dibutyl tin dilaurate |
| Filler-1 | Filler-1 is an aluminum hydroxide having a broad particle size distribution including $D_{10}$, $D_{50}$, and $D_{90}$ of about 0.5 µm, about 8 µm, and about 80 µm, respectively; a sieve residue (>45 µm) of about 35%, and $Al(OH)_3$ concentration of about 99.7 wt. %. $D_{90}/D_{50}$ is about 10 and $D_{90}/D_{10}$ is about 160. It is believed that ATH-1 has a bimodal particle size distribution with an average size of the smaller particles being less than about 10 µm and the average size of the larger particles being greater than about 50 µm. Particle size is measured according to ISO 13320, using a $2.24 \times 10^{-3}$M solution of Tetrasodium pyrophosphate decahydrate (1 g $Na_4P_2O_7 \times 10H_2O$ in 1000 ml deionized water) as dispersion medium. |
| Filler-2 | Filler-2 is a CALOFORT SV calcium carbonate commercially available from CARY COMPANY. |
| Fatty Acid-1 | Fatty Acid-1 is a methyl ester of an unsaturated $C_{16}$-$C_{18}$ fatty acid |
| EPOXY RESIN-1 | A liquid epoxy resin that is a reaction product of epichlorohydrin and propylene glycol having an epoxide equivalent weight of about 320 g/eq (ASTM D-1652); a concentration of epoxide groups of about 13.0-13.9% (ASTM D-1652); a viscosity at 25° C. of about 65 (ASTM D-445); a density of about 1.06 g/ml (ASTM D-4052); and a flash point of about 194° C. (ASTM D-3278). |
| POLYAMINE-1 (polyoxypropylene diamine) | Polyamine-1 is a difunctional amine having an average of about two spaced apart —$NH_2$ groups. This polyamine has a number average molecular weight of about 2000 g/mole. The concentration of amine is about 0.96-1.05 meq/g. About 97% of the amines are primary amines. The amine hydrogen equivalent weight is about 514 g/eq, and the Brookfieldviscosity is about 247 cpt at 25° C. |
| POLYAMINE-2 (Glyceryl poly(oxyproylene) triamine) | Polyamine-2 is a trifunctional amine having an average of about three spaced apart —$NH_2$ groups. This polyamine is a polyetheramine having a number average molecular weight of about 3000 g/mole. The concentration of amine is about 0.90-0.98 meq/g. About 97% of the amines are primary amines. The amine hydrogen equivalent weight is about 530 g/eq, and the viscosity is about 367 cSt at 25° C. |
| POLYAMINE-3 (polyoxypropylene diamine) | Polyamine-3 is a difunctional amine having an average of about two spaced apart —$NH_2$ groups. This polyamine has a number average molecular weight of about 430 g/mole. The concentration of amine is about 4.1-4.7 meq/g. About 97% of the amines are primary amines. The amine hydrogen equivalent weight is about 115 g/eq, and the viscosity is about 22 cSt at 25° C. |
| POLYOL-1 | Polyether diol based on propylene glycol having a number average molecular weight of about 1000 g/mole; a hydroxyl number (as KOH) of about106-114 mg/g (ASTM D 4274D); a viscosity of about 135-155 cSt (ASTM D 4878). |
| POLYOL-2 | Polyether triol having a hydroxyl number of about 56 and a viscosity of about 485 mPa-s at 25° C. |
| POLYOL-3 | Polyol-3 is linear polyester diol derived from caprolactone monomer, terminated by primary hydroxyl groups. It is a white waxy solid with a melting point between 40-50° C. and an hydroxyl value of 54-58 mg KOH/g. |
| COLORANT-1 | Green dye dispersed in a liquid epoxy resin |
| Dibutyltin dilaurate | Lewis Acid Catalyst |
| AMINE CAT-1 | Tris-2,4,6-dimethylaminomethyl phenol is an amine catalyst having an amine valude of about 630 mg KOH/g; a viscosity of about 120-250 mPa-s at 25° C.; and a boiling point of about 250° C. |
| DABCO (1,4-diazabicyclo[2.2.2]octane) | Lewis base catalyst DABCO LV33 (from Evonik: 33% 1,4-diazabicyclo[2.2.2]octane in dipropyleneglycol) |

EXAMPLES

Carbamate Prepolymer-1

The Carbamate Prepolymer-1 is prepared using the composition shown in TABLE 2. The cardanol and polyisocyanate prepolymer-1 are added to a reactor and heated to about 60° C. with continuous mixing. Dibutyltin dilaurate catalyst is then added and the reaction is carried out under nitrogen at a temperature of about 80° C. for about 45 minutes. After 45 minutes, a vacuum applied for 10 minutes and the reactor is cooled to room temperatures. The reaction product (Carbamate Prepolymer-1) has the following properties shown in TABLE 2. Molecular Weight data of the polyurethane prepolymers were measured by gel permeation chromatography (GPC) with a Malvern Viscothek GPC max equipment. EMSURE-THF (ACS, Reag. Ph EUR for analysis) was used as an eluent, PL GEL MIXED D (Ailent, 300*7.5 mm, 5 μm) was used as a column, and MALVERN Viscotek TDA was used as a detector.

TABLE 2

| Composition and properties of Carbamate Prepolymer-1 | | |
|---|---|---|
| | | Carbamate Prepolymer-1 |
| Polyisocyanate Prepolymer-1 | Weight % | |
| Cardanol | Weight % | |
| Dibutyltin dilaurate catalyst | Weight % | |
| Total | | 100 |
| Viscosity at 23° C. | Pa · s | 45 |
| NCO Content (upper limit) | Weight % | ≤0.8 |
| NCO Content (lower limit) | Weight % | ≥0.0 |
| Weight Averager Molecular Weight | g/mole (GPC) | 3500 |
| Polydispersity Index | (GPC) | 1.1' |

Examples A-1, A-2, A-3, and A-4 are part A composition including an isocyanate prepolymer. These compositions are prepared by first mixing the liquid components and then adding the filler in the amounts shown in TABLE 3. A planetary mixer is used for mixing all of the part A compositions and for mixing all of the part B compositions the materials. Examples A-1, A-2, A-3, and A-4 all have high initial Press-In forces and also become solid after 3 days at 55° C., as shown in Table 3.

Thermal conductivity was measured according to ASTM 5470-12 on a therma interface material tester from ZFW Stuttgart, with tests performed in Spaltplus mode at a thickness of between 1.8-1.2 mm; the described thermal interface material is considered as Type I (viscous liquids) as described in ASTM 5470-12, the upper contact is heated to ca 40° C. and the lower contact to ca 10° C., resulting in a sample temperature of ca 25° C.

TABLE 3

| COMPONENT-A COMPOSITIONS (HAVING AN ISOCYANATE PREPOLYMER) | | | | |
|---|---|---|---|---|
| | EXAMPLE A-1 | EXAMPLE A-2 | EXAMPLE A-3 | EXAMPLE A-4 |
| Polyisocyanate Prepolymer-1 (wt. %) | 5.0 | 10.0 | | |
| Polyisocyanate Prepolymer-2 (wt. %) | | | 5.0 | 4.0 |
| Filler-1 (wt. %) | 90.0 | 85.0 | 90.0 | 88.0 |
| Fatty Acid-1 (wt. %) | 4.0 | 4.0 | 4.0 | 6.0 |
| Hexadecyltrimethoxysilane (wt. %) | 1.0 | 1.0 | 1.0 | 2.0 |
| Total | 100.0 | 100.0 | 100.0 | 100.0 |
| Ability to mix | Good | Good | Good | Good |
| Initial Press-In Force, (N) | 1056 | 538 | 975 | 427 |
| Press-In Force after 3 days @ 55° C., (N) | Solid | Solid | Solid | Solid |
| Thermal conductivity, λ (W/mK) | — | — | — | 2.35 |

In Examples A-4, A-5, A-6, A-7, and A-8, the addition of extra silane compound and/or the additional of dimethyl malonate appear to reduce the initial press-in force. However, all of these materials have poor shelf stability as shown by the solidifying of the composition after 3 days at 55° C., such that the composition can no longer be tested for press-in force, as shown in Table 4.

TABLE 4

| COMPONENT-A COMPOSITIONS (HAVING AN ISOCYANTE PREPOLYMER) | | | | |
|---|---|---|---|---|
| | EXAMPLE A-5 | EXAMPLE A-6 | EXAMPLE A-7 | EXAMPLE A-8 |
| Polyisocyanate Prepolymer-1 (wt. %) | — | — | — | — |
| Polyisocyanate Prepolymer-2 (wt. %) | 7.0 | 7.3 | 4.0 | 4.0 |
| Filler-1 (wt. %) | 87.0 | 86.0 | 88.0 | 88.0 |
| Fatty Acid-1 (wt. %) | 3.0 | 4.7 | 5.5 | 5.0 |
| Hexadecyltrimethoxysilane (wt. %) | 3.0 | 2.0 | 2.0 | 2.0 |
| Dimethylmalonate | — | — | 0.5 | 1.0 |
| Total | 100.0 | 100.0 | 100.0 | 100.0 |
| Ability to mix | Good | Good | Good | Good |
| Initial Press-In Force, (N) | 368 | 311 | 206 | 152 |
| Press-In Force after 3 days @ 55° C., (N) | Solid | Solid | Solid | Solid |
| Thermal conductivity, λ (W/mK) | — | 2.17 | — | — |

Example B-1 is a part B composition including a polyol component and having the composition shown in Table 5.

TABLE 5

| COMPONENT-B COMPOSITION (HAVING A POLYOL) | |
| --- | --- |
| | EXAMPLE B-1 |
| POLYOL-1 (wt. %) | 5.0 |
| Filler-1 (wt. %) | 90 |
| Fatty Acid-1 (wt. %) | 3.85 |
| Hexadecyltrimethoxysilane (wt. %) | 1.0 |
| Dioctyltin thioglycolate catalyst | 0.15 |
| Total | 100.0 |
| Ability to mix | Good |

TABLE 5-continued

| COMPONENT-B COMPOSITION (HAVING A POLYOL) | |
| --- | --- |
| | EXAMPLE B-1 |
| Initial Press-In Force, (N) | 139 |
| Thermal conductivity, λ (W/mK) | 3.02 |

Examples A-9, A-10, A-11, A-12, A-13, A-14, A-15, A-16, A-17, A-18, A-19, and A-20 are Part A compositions are prepared using Carbamate-Prepolymer-1, the compositions and properties of these compositions are shown in Tables 7, 8 and 9. Here, it is seen that it is possible to prepare a part A composition with low initial viscosity, good thermal stability, and high thermal conductivity.

TABLE 6

| COMPONENT-A COMPOSITIONS (HAVING A CARBAMATE PREPOLYMER) | | | | | |
| --- | --- | --- | --- | --- | --- |
| | EXAMPLE A-9 | EXAMPLE A-10 | EXAMPLE A-11 | EXAMPLE A-12 | EXAMPLE A-13 |
| Carbamate Prepolymer-1 (wt. %) | 2.0 | 4.0 | 4.0 | 3.0 | 3.0 |
| Epoxy Resin-1 (wt. %) | 2.0 | — | — | — | 1.0 |
| Filler-1 (wt. %) | 88.0 | 88.0 | 90.0 | 90.5 | 91.0 |
| Filler-2 (wt. %) | 2.0 | — | — | — | — |
| Fatty Acid-1 (wt. %) | 5.75 | 6.0 | 4.0 | 4.5 | 3.0 |
| Hexadecyltrimethoxysilane (wt. %) | — | 2.0 | 2.0 | 2.0 | 2.0 |
| Dioctyltin dineodecanoate (wt. %) | 0.15 | — | — | — | — |
| Colorant-1 (wt. %) | 0.1 | — | — | — | — |
| Total | 100.0 | 100.0 | 100.0 | 100.0 | 100.0 |
| Ability to mix | Good | Good | Good | Good | Good |
| Initial Press-In Force, (N) | 226 | 58 | 150 | 175 | 269 |
| Press-In Force after 3 days @ 55° C., (N) | 224 | 102 | 250 | — | — |
| Thermal conductivity, λ (W/mK) | — | — | 3.06 | 3.22 | — |

TABLE 7

| COMPONENT-A COMPOSITIONS (HAVING A CARBAMATE PREPOLYMER) | | | | | | | | |
| --- | --- | --- | --- | --- | --- | --- | --- | --- |
| | EXAMPLE A-14 | EXAMPLE A-15 | EXAMPLE A-16 | EXAMPLE A-17 | EXAMPLE A-18 | EXAMPLE A-19 | EXAMPLE A-20 | EXAMPLE A-21 |
| Carbamate Prepolymer-1 (wt. %) | 3.0 | 3.0 | 3.0 | 2.0 | 2.5 | 2.0 | 2.0 | 2 |
| Epoxy Resin-1 (wt. %) | — | — | — | 1.5 | 1.5 | 3.0 | 3.0 | 0.5 |
| Filler-1 (wt. %) | 90.4 | 89.4 | 88.4 | 88.0 | 88.0 | 89.0 | 89.0 | 87.6 |
| Filler-2 (wt. %) | — | 1.0 | 2.0 | 2.0 | 2.0 | 1.0 | 1.0 | 2 |
| Fatty Acid-1 (wt. %) | 4.5 | 4.5 | 4.5 | 6.25 | 5.75 | 3.9 | 3.75 | 3.35 |
| Tris(2-ethylhexyl) phosphate | — | — | — | — | — | — | — | 3.3 |
| POLYOL-3 | — | — | — | — | — | — | — | 0.15 |
| Hexadecyltri-methoxysilane (wt. %) | 2.0 | 2.0 | 2.0 | — | — | 1.0 | 1.0 | 1.0 |
| Dioctyltin dineodecanoate (wt. %) | — | — | — | 0.15 | 0.15 | — | 0.15 | — |
| Colorant-1 (wt. %) | 0.1 | 0.1 | 0.1 | 0.1 | 0.1 | 0.1 | 0.1 | 0.1 |
| Total | 100.0 | 100.0 | 100.0 | 100.0 | 100.0 | 100.0 | 100.0 | 100.0 |
| Ability to mix | Good | Good | Good | Good | Good | Good | Good | Good |
| Initial Press-In Force, (N) | 201 | 199 | 232 | 285 | 284 | — | — | 210 |
| Press-In Force after 3 days @ 55° C., (N) | 472 | 261 | 331 | — | — | — | — | — |
| Thermal conductivity, λ (W/mK) | 3.11 | 3.19 | 3.19 | — | — | — | — | 3.11 |

Examples B-2, B-3, B-4, B-5, B-6, B-7, and B-8 are part B compositions including a carbamate-reactive compound (e.g., a polyamine) capable of reacting with a part A composition including a carbamate-containing compound.

TABLE 9

| COMPONENT-B COMPOSITIONS (HAVING A POLYAMINE) | | | | | | |
|---|---|---|---|---|---|---|
| | EXAMPLE B-2 | EXAMPLE B-3 | EXAMPLE B-4 | EXAMPLE B-5 | EXAMPLE B-6 | EXAMPLE B-9 |
| Polyamine-1, difunctional (wt. %) | 1.5 | 2.5 | 3.0 | 2.5 | 3.0 | — |
| Polyamine-2, trifunctional (wt. %) | 1.5 | — | — | — | — | 1.67 |
| Filler-1 (wt. %) | 88.0 | 90.5 | 90.5 | 89.5 | 88.0 | 88.9 |
| Filler-2 (wt. %) | 2.0 | — | — | 1.0 | 2.0 | 2.0 |
| Fatty Acid-1 (wt. %) | 4.5 | 5.3 | 4.7 | 5.3 | 4.5 | 3.1 |
| Tris(2-ethylhexyl) phosphate (wt. %) | — | — | — | — | — | 3.08 |
| POLYOL-3 | — | — | — | — | — | 0.15 |
| Hexadecyltri-methoxysilane (wt. %) | 2.0 | 1.5 | 1.5 | 1.5 | 2.0 | 1.0 |
| DABCO LV33 | — | — | — | — | — | 0.1 |
| Tris-2,4,6-dimethyl-aminomethyl phenol (wt. %) | 0.5 | — | — | — | 0.5 | — |
| Dioctyltin dineodecanoate (wt. %) | — | 0.15 | 0.15 | 0.15 | — | — |
| 2,2'-Dimorpholinyl-diethylether (wt. %) | — | 0.05 | 0.15 | 0.05 | — | — |
| Total | 100.0 | 100.0 | 100.0 | 100.0 | 100.0 | 100.0 |
| Ability to mix | Good | Good | Good | Good | Good | Good |
| Initial Press-In Force, (N) | 102 | 366 | 492 | 373 | 123 | 209 |
| Press-In Force after 3 days @ 55° C., (N) | 108 | — | — | — | — | — |
| Thermal conductivity, λ (W/mK) | — | 3.11 | — | 3.06 | — | — |

TABLE 10

| COMPONENT-B COMPOSITIONS (HAVING A POLYAMINE) | | |
|---|---|---|
| | EXAMPLE B-7 | EXAMPLE B-8 |
| Polyamine-1, difunctional (wt. %) | 2.5 | 2.5 |
| Polyamine-3, difunctional (wt. %) | 0.5 | 0.5 |
| Filler-1 (wt. %) | 89.0 | 89.0 |
| Filler-2 (wt. %) | 1.0 | 1.0 |
| Fatty Acid-1 (wt. %) | 5.0 | 4.8 |
| Hexadecyltrimethoxysilane (wt. %) | 1.0 | 1.0 |
| Tris-2,4,6-dimethylamino-methyl phenol (wt. %) | — | 0.20 |
| POLYOL-2 (wt. %) | 1.0 | 1.0 |
| Total | 100.0 | 100.0 |
| Ability to mix | Good | Good |

Examples 1 and 2 are 2-part compositions based on a first part including an isocyanate and a second part including a polyol capable of reacting with the isocyanate. These compositions are shown in Table 11.

TABLE 11

| TWO-COMPONENT COMPOSITIONS (BASED ON ISOCYANATE A COMPONENT AND POLYOL B COMPONENT) | | |
|---|---|---|
| | EXAMPLE 1 | EXAMPLE 2 |
| A-Component (50 volume %) | Example A-4 | Example A-6 |

TABLE 11-continued

| TWO-COMPONENT COMPOSITIONS (BASED ON ISOCYANATE A COMPONENT AND POLYOL B COMPONENT) | | |
|---|---|---|
| | EXAMPLE 1 | EXAMPLE 2 |
| B-Component (50 volume %) | Example B-1 | Example B-1 |
| Average ATH concentration (wt. %) | 89 | 88 |
| Average calcium carbonate concentration (wt. %) | 0 | 0 |
| Average total filler concentration (wt. %) | 89 | 88 |
| Thermal conductivity, λ (W/mK) | 2.76 | 2.63 |
| Initial Press-In Force, (N) | 291 | 364 |
| Press-In Force after 24 hours at 23 C., (N) | — | 876 |
| Press-In Force after 72 hours at 23 C., (N) | — | 1397 |
| Press-In Force after 168 hours at 23 C., (N) | 1147 | 1739 |

Examples 3-14 are thermal interface materials based on a carbamate-containing A component and a polyamine containing B component. As shown in Tables 12 and 13, when the carbamate-containing A component and the polyamine containing B component are mixed, the composition has a generally low initial press-in force that allows filling of a gap. This is even possible when the thermal conductivity is about 3 W/mK. For example, when the composition includes more than 85 weight percent aluminum hydroxide and/or 89 weight percent or more total concentration of filler.

TABLE 12

| | EXAMPLE 3 | EXAMPLE 4 | EXAMPLE 5 | EXAMPLE 6 |
|---|---|---|---|---|
| TWO-COMPONENT COMPOSITIONS (BASED ON CARBAMATE-CONTAINING A COMPONENT AND POLYAMINE-CONTAINING B COMPONENT) | | | | |
| A-Component (50 volume %) | Example A-9 | Example A-12 | Example A-13 | Example A-14 |
| B-Component (50 volume %) | Example B-2 | Example B-3 | Example B-4 | Example B-3 |
| Average ATH concentration (wt. %) | 88 | 90.5 | 90.75 | 90.45 |
| Average $CaCO_3$ concentration (wt. %) | 2 | 0 | 0 | 0 |
| Average total filler concentration (wt. %) | 90 | 90.5 | 90.75 | 90.45 |
| Thermal conductivity, $\lambda$ (W/mK) | 3.03 | 2.98 | 2.90 | 2.93 |
| Initial Press-In Force, (N) | 181 | 232 | — | 270 |
| Press-In Force after 24 hours at 23 C., (N) | 737 | 1719 | — | 975 |
| Press-In Force after 72 hours at 23 C., (N) | Cured | 1719 | — | — |
| Press-In Force after 168 hours at 23 C., (N) | — | 2091 | — | 4939 |

TABLE 13

| | EXAMPLE 7 | EXAMPLE 8 | EXAMPLE 9 | EXAMPLE 10 |
|---|---|---|---|---|
| TWO-COMPONENT COMPOSITIONS (BASED ON CARBAMATE-CONTAINING A COMPONENT AND POLYAMINE-CONTAINING B COMPONENT) | | | | |
| A-Component (50 volume %) | Example A-15 | Example A-9 | Example A-17 | Example A-18 |
| B-Component (50 volume %) | Example B-5 | Example B-6 | Example B-2 | Example B-2 |
| Average ATH concentration (wt. %) | 89.45 | 88.0 | 88.0 | 88.0 |
| Average $CaCO_3$ concentration (wt. %) | 1.0 | 2.0 | 2.0 | 2.0 |
| Average total filler concentration (wt. %) | 90.45 | 90.0 | 90.0 | 90.0 |
| Thermal conductivity, $\lambda$ (W/mK) | — | — | — | — |
| Initial Press-In Force, (N) | 227 | 151 | 145 | 176 |
| Press-In Force after 4 hours at 23 C., (N) | 538 | — | — | — |
| Press-In Force after 24 hours at 23 C., (N) | — | 703 | 738 | 980 |

TABLE 14 shows the importance of having a catalyst in the A Component and/or in the B-Component for affecting an increase in the viscosity (as characterized by the press-in force) at room temperature.

TABLE 14

| | EXAMPLE 11 | EXAMPLE 12 | EXAMPLE 13 | EXAMPLE 14 | EXAMPLE 15 |
|---|---|---|---|---|---|
| TWO-COMPONENT COMPOSITIONS (BASED ON CARBAMATE-CONTAINING A COMPONENT AND POLYAMINE-CONTAINING B COMPONENT) | | | | | |
| A-Component (50 volume %) | Example A-19 | Example A-19 | Example A-20 | Example A-20 | Example A-21 |
| B-Component (50 volume %) | Example B-5 | Example B-6 | Example B-2 | Example B-2 | Example B-9 |
| Average ATH concentration (wt. %) | 89.0 | 89.0 | 89.0 | 89.0 | 88.05 |
| Average $CaCO_3$ concentration (wt. %) | 1.0 | 1.0 | 1.0 | 1.0 | 2 |
| Average total filler concentration (wt. %) | 90.0 | 90.0 | 90.0 | 90.0 | 90.05 |

TABLE 14-continued

TWO-COMPONENT COMPOSITIONS (BASED ON CARBAMATE-CONTAINING
A COMPONENT AND POLYAMINE-CONTAINING B COMPONENT)

| | EXAMPLE 11 | EXAMPLE 12 | EXAMPLE 13 | EXAMPLE 14 | EXAMPLE 15 |
|---|---|---|---|---|---|
| Alkyl-Sn Catalyst in A-Component | No | No | Yes | Yes | No |
| Amine catalyst in B-Component | No | Yes | No | Yes | — |
| Lewis base component in B-Component (DABCO) | — | — | — | — | Yes |
| Initial Press-In Force, (N) | 147 | 160 | 256 | 228 | 133 |
| Press-In Force after 1 hour at 23 C., (N) | — | — | — | — | 186 |
| Press-In Force after 2 hours at 23 C., (N) | — | — | — | — | 1965 |
| Press-In Force after 24 hours at 23 C., (N) | 214 | 222 | 396 | 395 | cured |
| Press-In Force after 48 hours at 23 C., (N) | 232 | 237 | 520 | 378 | — |
| Press-In Force after 72 hours at 23 C., (N) | 229 | 424 | 450 | 481 | — |
| Thermal conductivity, λ (W/mK) | — | — | — | — | 3.0 |

What is claimed is:

1. A two-part composition for a thermal interface material comprising:
   i) a first part comprising at least
   a) a prepolymer including two or more carbamate groups formed by blocking one or more isocyanate groups of the prepolymer;
   ii) a second part comprising at least:
   b) one or more polyamine compounds with a number average molecular weight of about and above 2000 g/mole and capable of a reaction with the prepolymer; wherein the composition includes:
   c) one or more catalysts for catalyzing the reaction between the prepolymer and the polyamine compounds; and
   d) 50 weight percent or more of one or more thermally conductive fillers, based on the total weight of the two-part composition; and
   wherein a molar ratio of the carbamate groups in the first part to amine groups of the polyamine compounds in the second part is from about 0.1 or more to about 10 or less.

2. The two-part composition of claim 1, wherein the two or more carbamate groups of the prepolymer are formed by blocking one or more of the isocyanate groups of an aromatic polyisocyanate prepolymer with a phenol group of a blocking compound.

3. The two-part composition of claim 2, wherein the blocking compound includes a terminal phenol group attached to a linear hydrocarbon with 6 or more carbon atoms.

4. The two-part composition of claim 1, wherein the one or more polyamines, the prepolymer, or both have an average functionality of greater than 2; and wherein the one or more polyamines comprise polyetheramine with a number average molecular weight of about 3000 g/mole.

5. The two-part composition of claim 1, wherein the one or more thermally conductive fillers includes a filler selected from aluminum hydroxide, aluminum oxide, aluminum powder, zinc oxide, boron nitride, and/or mixtures of any of these.

6. The two-part composition of claim 5, wherein the one or more thermally conductive fillers include a filler selected from aluminum hydroxide, aluminum oxide, and/or mixtures of any of these.

7. The two-part composition of claim 6, wherein the one or more thermally conductive fillers is aluminum hydroxide.

8. The two-part composition of claim 1, wherein the first part includes 75 weight percent or more aluminum hydroxide, based on the total weight of the first part; and
   the second part includes 75 weight percent or more aluminum hydroxide, based on the total weight of the second part.

9. The two-part composition of claim 7, wherein a surface of the aluminum hydroxide is partially or entirely coated with a surface modifier for reducing the hydrophilicity of the surface.

10. The two-part composition of claim 7, wherein the aluminum hydroxide has a broad particle size distribution with a D90/D50 ratio of about 3 or more, wherein particle size is measured according to ISO 13320, using a $2.24 \times 10^{-3}$ M solution of Tetrasodium pyrophosphate decahydrate (1 g $Na_4P_2O_7 \cdot X10H_2O$ in 1000 ml deionized water) as dispersion medium.

11. The two-part composition of claim 1, wherein the composition includes one or more plasticizers.

12. The two-part composition of claim 1, wherein the composition includes a fatty acid or an ester of a fatty acid.

13. The two-part composition of claim 1, wherein the composition comprises an epoxy resin in the first part, and wherein a weight ratio of the prepolymer to the epoxy resin is about 0.5 or more.

14. The two-part composition of claim 1, wherein the composition is substantially free of isocyanate containing compounds.

15. The two-part composition of claim 1, wherein the first part includes calcium carbonate in an amount of about 0.1 weigh percent or more, based on the total weight of the first part.

16. The two-part composition of claim 1, wherein the catalyst is selected from a Lewis acid or a Lewis base, a tin catalyst, or an amine catalyst.

17. The two-part composition of claim 1, wherein the catalyst is DABCO (1,4-diazabicyclo[2.2.2]octane).

18. The two-part composition of claim 1, wherein the first part includes some or all of the catalyst.

19. The two-part composition of claim 2, wherein all isocyanate groups of the polyisocyanate prepolymer are blocked with the phenol groups to form carbamate groups.

* * * * *